US007149736B2

(12) United States Patent
Chkodrov et al.

(10) Patent No.: US 7,149,736 B2
(45) Date of Patent: Dec. 12, 2006

(54) MAINTAINING TIME-SORTED AGGREGATION RECORDS REPRESENTING AGGREGATIONS OF VALUES FROM MULTIPLE DATABASE RECORDS USING MULTIPLE PARTITIONS

(75) Inventors: Gueorgui Bonov Chkodrov, Redmond, WA (US); Richard Zachary Jason, Seattle, WA (US); Eric Anthony Reel, Seattle, WA (US); Chun Yu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 10/670,561

(22) Filed: Sep. 26, 2003

(65) Prior Publication Data

US 2005/0071320 A1   Mar. 31, 2005

(51) Int. Cl.
*G06F 17/30* (2006.01)
*G06F 7/00* (2006.01)
(52) U.S. Cl. ............................ 707/7; 707/1; 707/100; 707/200
(58) Field of Classification Search ................ 707/1–7, 707/10, 100–104.1, 200–201; 706/45–50; 709/218–225
See application file for complete search history.

(56) References Cited

U.S. PATENT DOCUMENTS

| 5,319,780 A | 6/1994 | Catino et al. |
| 5,537,589 A | 7/1996 | Dalal |
| 5,590,319 A * | 12/1996 | Cohen et al. ................ 707/4 |
| 5,625,815 A | 4/1997 | Maier et al. |
| 5,713,020 A | 1/1998 | Reiter et al. |
| 5,717,919 A | 2/1998 | Kodavalla et al. |
| 5,781,896 A | 7/1998 | Dalal |
| 5,822,751 A | 10/1998 | Gray et al. |
| 5,905,985 A | 5/1999 | Malloy et al. |

(Continued)

FOREIGN PATENT DOCUMENTS

EP           1164509   * 12/2001   ................ 17/30

(Continued)

OTHER PUBLICATIONS

Lingyu Wang et al. "securing OLAP data cubes against privacy breaches", proceedings of the 2004 IEEE symposium on security and privacy, May 2004, pp. 161-175.*

(Continued)

*Primary Examiner*—Srirama Channavajjala
(74) *Attorney, Agent, or Firm*—Banner & Witcoff, Ltd.

(57) ABSTRACT

Multiple aggregation groups, which can be multiple partitions in an aggregated data table, are formed. Each group includes multiple aggregation records; each aggregation record includes an aggregation of values contained by a different subset of multiple database records. While an aggregation group is accessed by a single program thread during an aggregation group update transaction, no other threads are allowed to access that group. The aggregation groups are combined into a single table of aggregation records. Each of the multiple database records may correspond to an instance of an organizational activity and include a field having a value indicating the corresponding instance to be in one of several process states. Each aggregation group may further include time-sorted aggregation records, each time-sorted aggregation record containing an aggregation value for instances in one of the several process states during a time period associated with the time-sorted aggregation record. Aggregation records corresponding to instances completed outside of a preselected time window are deleted.

33 Claims, 14 Drawing Sheets

U.S. PATENT DOCUMENTS

| | | | |
|---|---|---|---|
| 5,926,818 A | | 7/1999 | Malloy |
| 5,940,818 A | | 8/1999 | Malloy et al. |
| 5,943,668 A | | 8/1999 | Malloy et al. |
| 5,978,796 A | | 11/1999 | Malloy et al. |
| 6,064,999 A | | 5/2000 | Dalal |
| 6,115,705 A | * | 9/2000 | Larson .......................... 707/3 |
| 6,122,636 A | | 9/2000 | Malloy et al. |
| 6,205,447 B1 | | 3/2001 | Malloy |
| 6,374,263 B1 | | 4/2002 | Bunger et al. |
| 6,430,565 B1 | | 8/2002 | Berger et al. |
| 6,438,537 B1 | | 8/2002 | Netz et al. |
| 6,442,560 B1 | | 8/2002 | Berger et al. |
| 6,496,909 B1 | | 12/2002 | Schimmel |
| 6,502,086 B1 | | 12/2002 | Pratt |
| 6,516,322 B1 | | 2/2003 | Meredith |
| 6,542,895 B1 | | 4/2003 | DeKimpe et al. |
| 6,546,395 B1 | | 4/2003 | DeKimpe et al. |
| 6,594,653 B1 | | 7/2003 | Colby et al. |
| 6,598,079 B1 | | 7/2003 | Pal et al. |
| 6,603,839 B1 | | 8/2003 | Smith, Jr. et al. |
| 6,665,682 B1 | * | 12/2003 | DeKimpe et al. ........... 707/101 |
| 6,728,709 B1 | | 4/2004 | Plasek et al. |
| 6,895,581 B1 | * | 5/2005 | Chkodrov et al. .......... 717/159 |
| 6,988,108 B1 | * | 1/2006 | Bernhardt et al. .......... 707/102 |
| 2001/0051907 A1 | * | 12/2001 | Kumar et al. .................. 705/36 |
| 2002/0143763 A1 | * | 10/2002 | Martin et al. ................... 707/7 |
| 2003/0004944 A1 | * | 1/2003 | Harper et al. ................... 707/7 |
| 2003/0061132 A1 | * | 3/2003 | Yu et al. ........................ 705/30 |
| 2003/0115206 A1 | | 6/2003 | Gilbert |
| 2003/0149702 A1 | | 8/2003 | Saffer et al. |
| 2003/0204421 A1 | * | 10/2003 | Houle et al. .................... 705/4 |
| 2003/0225769 A1 | * | 12/2003 | Chkodrov et al. .......... 707/100 |
| 2004/0006574 A1 | * | 1/2004 | Witkowski et al. ...... 707/104.1 |
| 2004/0010500 A1 | * | 1/2004 | Madduri et al. ............. 707/100 |
| 2004/0083222 A1 | * | 4/2004 | Pecherer ..................... 707/100 |
| 2004/0111410 A1 | * | 6/2004 | Burgoon et al. ................ 707/4 |
| 2004/0148420 A1 | * | 7/2004 | Hinshaw et al. ............ 709/231 |
| 2004/0243593 A1 | * | 12/2004 | Stolte et al. ................. 707/100 |
| 2004/0267818 A1 | * | 12/2004 | Hartenstine .............. 707/104.1 |
| 2005/0071341 A1 | * | 3/2005 | Chkodrov et al. .......... 707/100 |
| 2005/0144191 A1 | * | 6/2005 | Chkodrov et al. .......... 707/102 |

FOREIGN PATENT DOCUMENTS

| | | | |
|---|---|---|---|
| WO | WO 01/11497 | * | 2/2001 |
| WO | WO 02/42952 | * | 5/2002 |
| WO | WO 2004/031940 | * | 4/2004 |
| WO | WO 2004/084092 | * | 9/2004 |
| WO | WO2005/029275 | * | 3/2005 |
| WO | WO 2005/091138 | * | 9/2005 |
| WO | WO2005/091736 | * | 10/2005 |

OTHER PUBLICATIONS

Lenz,H et al. "OLAP databases and aggregation functions", scientific and statistical database manaagement 2001, thrteenth international conference, Julay 2001, pp. 91-100.*

Dimitri Theodoratos et al. "Heuristic optimization of OLAP queries in multidiemnsionally hierarichally clustered databases", proceedings of the 4th ACM international workshop on data warehousing and OLAP, 2001, pp. 48-55.*

Jim Gray et al. "data cube: a relational aggregation operator generalizing group-by, cross-tab, and sub-totals", Technical report: MSR-TR-95-22. Nov. 1995, 8 pages.*

Bellatreche,L et al. "OLAP query processing for partitioned data warehouses", proceedings 1999 internatinal symposium on database applications in non-traditional environments, 1999, pp. 35-42.*

Kline,N et al. "computing temporal aggregates", eleventh international conference on data engineering, 1995, pp. 222-231.*

Stefano Ceri et al., "Deriving Production Rules for Incremental View Maintenance," *Proc. Of 1991 VLDB Conference*, pp. 577-589, 1991.

D. Gavalas et al., "Enabling Mobile Agent Technology for Intelligent Bulk Management Data Filtering," *IEEE*, 2000 pp. 623-636, 2000.

D.L. Giles, "Usage Measurement in Support of Billing for Connectionless Data Services," *Bell Communications Research, Inc.*, 17.4-1-174-10, 1990.

G.M.E. Lafue, "Integrating language and database for CAD applications," *Computer Aided Design*, vol. 11, No. 3, pp. 127-130, May 1979.

James F. Leary et al., "Real-Time Decision-Making for High-Throughput-Screening Applications," Optical Diagnostics of Living Cells IV. *Proceedings of SPIE* vol. 4260 pp. 219-225 (2001).

Wolfgang Lehner, "Improving Query Response Time in Scientific Databases Using Data Aggregation—A Case Study," *Proc. Of 7th Int'l Workshop on Database and Expert Systems Applns.*, IEEE, pp. 201-206 (1996).

Shira Levine, "In the Black," *America's Network*, p. 18, May 15, 2002.

David B. Lomet, "Subsystems of Processes with Deadlock Avoidance," *IEEE Transactions on Software Engineering*, vol. SE-6, No. 3, May 1980.

Mukesh Muhania, "Making aggregate views self-maintainable," *Data & Knowledge Engineering*, 32, pp. 87-109, 2000.

Kevin Reardon, "The Role of Data Archives in Synoptic Solar Physics," *Synoptic Solar Physics Conference*, ASP Conference Series, vol. 140, pp. 467-474, 1998.

Cyrus Shahabi et al., "An Adaptive Recommendation System without Explicit Acquisition of User Relevance Feedback," *Distributed and Parallel Databases*, 14, 173-192 (2003).

Abraham Silberschatz et al., "A Family of Locking Protocols for Database Systems that Are Modeled by Directed Graphs," *IEEE Transactions on Software Engineering*, vol. SE-8, No. 6, pp. 558-562, Nov. 1982.

Book *Inside Microsoft® SQL Server 2000* by Kalen Delaney, 2001, 1090 pages.

* cited by examiner

| PO# | RecvTime | City | Quantity | ShipTime | DeliveryTime | ProcessState |
|---|---|---|---|---|---|---|
| ... | ... | ... | ... | ... | ... | ... |
| 123 | 8:00am | Seattle | 150 | 8:24am | 12:45pm | Delivered |
| 124 | 8:30am | Seattle | 234 | 8:45am | 1:20pm | Delivered |
| 125 | 8:35am | Redmond | 87 | 9:05am | 2:30pm | Delivered |
| 126 | 8:45am | Seattle | 450 | 9:20am | 3:10pm | Delivered |
| 127 | 8:55am | Redmond | 200 | 9:30am | <NULL> | Shipped |
| 128 | 8:57am | Seattle | 340 | 9:20am | 3:05pm | Delivered |
| 129 | 9:12am | Seattle | 120 | 9:45am | <NULL> | Shipped |
| 130 | 9:30am | Redmond | 25 | 10:15am | <NULL> | Shipped |
| 131 | 9:45am | Seattle | 250 | 10:35am | <NULL> | Shipped |
| 132 | 10:00am | Redmond | 100 | <NULL> | <NULL> | InProcess |
| 133 | 10:15am | Seattle | 230 | <NULL> | <NULL> | InProcess |
| 134 | 10:25am | Redmond | 45 | <NULL> | <NULL> | InProcess |
| ... | ... | ... | ... | ... | ... | ... |

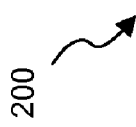

FIG. 2

| City | ProcessState | Quantity | Count |
|---|---|---|---|
| Redmond | Delivered | 87 | 1 |
| Redmond | InProcess | 145 | 2 |
| Redmond | Shipped | 225 | 2 |
| Seattle | Delivered | 1174 | 4 |
| Seattle | InProcess | 230 | 1 |
| Seattle | Shipped | 370 | 2 |

FIG. 3

New Purchase Order #135
for 30 containers from Redmond is received

| City | ProcessState | Quantity | Count |
|---|---|---|---|
| Redmond | Delivered | 87 | 1 |
| Redmond | InProcess | 145 | 2 |
| Redmond | Shipped | 225 | 2 |
| Seattle | Delivered | 1174 | 4 |
| Seattle | InPprocess | 230 | 1 |
| Seattle | Shipped | 370 | 2 |

+30 → Quantity
+1 → Count
New PO#135

| PartitionID | City | ProcessState | Quantity | Count |
|---|---|---|---|---|
| 0 | Redmond | Delivered | ... | ... |
| 0 | Redmond | InProcess | ... | ... |
| 0 | Redmond | Shipped | ... | ... |
| 0 | Seattle | Delivered | ... | ... |
| 0 | Seattle | InProcess | ... | ... |
| 0 | Seattle | Shipped | ... | ... |
| 1 | Redmond | Delivered | ... | ... |
| 1 | Redmond | InProcess | ... | ... |
| 1 | Redmond | Shipped | ... | ... |
| 1 | Seattle | Delivered | ... | ... |
| 1 | Seattle | InProcess | ... | ... |
| 1 | Seattle | Shipped | ... | ... |
| 2 | Redmond | Delivered | ... | ... |
| 2 | Redmond | InProcess | ... | ... |
| 2 | Redmond | Shipped | ... | ... |
| 2 | Seattle | Delivered | ... | ... |
| 2 | Seattle | InProcess | ... | ... |
| 2 | Seattle | Shipped | ... | ... |
| 3 | Redmond | Delivered | ... | ... |
| 3 | Redmond | InProcess | ... | ... |
| ... | ... | ... | ... | ... |

FIG. 8

| City | ProcessState | Quantity | Count |
|---|---|---|---|
| Redmond | Delivered | 87 | 1 |
| Redmond | InProcess | 145 | 2 |
| Redmond | Shipped | 225 | 2 |
| Seattle | Delivered | 1174 | 4 |
| Seattle | InProcess | 230 | 1 |
| Seattle | Shipped | 370 | 2 |

FIG. 9

| Hour | City | ProcessState | Quantity | Count |
|---|---|---|---|---|
| 8 | Redmond | Delivered | 87 | 1 |
|   | Seattle | Shipped | 200 | 1 |
| 9 | Redmond | Delivered | 1174 | 4 |
|   | Seattle | Shipped | 25 | 1 |
|   |   | Shipped | 370 | 2 |
| 10 | Redmond | InProcess | 145 | 2 |
|   | Seattle | InProcess | 230 | 1 |

MAINTAINING TIME-SORTED AGGREGATION RECORDS REPRESENTING AGGREGATIONS OF VALUES FROM MULTIPLE DATABASE RECORDS USING MULTIPLE PARTITIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to methods and computer systems for monitoring a workflow of a business or other organization. More particularly, the present invention relates to methods for aggregating information about multiple instances of an activity and for maintaining that aggregation.

BACKGROUND OF THE INVENTION

Computers, and in particular, computer database applications, are used by businesses and other organizations to monitor and record information about an organization's activities. Often, the organization will have various processes or activities that must be performed, and which recur frequently. Indeed, it is common for an organization to have numerous instances of an activity in various stages of completion at any given time. As one example, a business may sell goods based on orders received from customers. An activity of interest may be fulfilling those customer orders; each purchase order represents a separate instance of that activity. At any particular time, that business may have multiple instances of the activity (i.e., multiple orders from multiple customers) in various stages of completion. As but another example, a financial institution may loan funds to customers based on applications from those customers. An activity of interest may be the processing of a loan application to completion (e.g., approval or rejection), with each application representing a separate instance of the activity. At any particular time, there may be multiple loan application instances in various stages of processing. As yet another example, a governmental entity responsible for issuing permits may have multiple permit applications in various stages of being processed.

In order to monitor numerous instances of an activity, many organizations store information about those activity instances in a database program. In particular, a record or other data object can be created for each instance of the activity. A separate field or other component of the record is then established to hold a value for some type of information common to each instance. Using one of the previous examples as an illustration, a business selling goods may create a separate database record for each customer order. Within that record may be separate fields for the time the order was received, where the order was received, what was ordered, when the order was shipped, etc. Such use of a database program is often conceptualized as a table. Each instance of the activity is assigned a separate row (or tuple) of the table. Each type of information common to multiple instances is then assigned a separate column of the table.

Although the values of individual fields in individual records may sometimes be needed, many organizations frequently need information about groups of records. Moreover, this information is often needed in real-time. For example, many businesses that sell goods need to know how many orders are currently pending, how many orders have been completed, and how many orders are in one or more intermediate stages of completion. Certain database programs are able to provide such reports by aggregating values within multiple records of the database. Without more, however, this is often an unacceptable solution where the database is very large.

As more and more records accumulate, the speed with which a database can be accessed drops significantly. For a large business such as a goods seller receiving hundreds or thousands of orders per day, the number of records can reach into hundreds of thousands or millions. Each time the database is queried, a finite amount of time is needed to search a disk drive or other storage device. Similarly, as new records are created and existing records updated, a finite amount of time is needed to create or update each of those records. As the number of records grows, the time needed to find a particular record increases. In a business or organization having hundreds (or thousands) of users and hundreds of thousands (or millions) of database records, the latency for database system access can become quite substantial. Moreover, with numerous users attempting access the same information within the database, deadlocks between users trying to access the same records can occur. If numerous users are inserting and updating records into a large database while other users are attempting to access the database in order to generate a summary of various fields, all users may experience less-than-satisfactory database performance.

Another possible solution is to generate an On-Line Analytical Processing (OLAP) cube for data in a database. However, the processing required for generating OLAP cubes can also be quite time-consuming. If there are a significant number of database records, OLAP cubes can often only be generated on a daily (or sometimes hourly) basis. If an organization needs aggregated information in real-time, OLAP cubes will often not suffice.

SUMMARY OF THE INVENTION

The present invention addresses the above and other challenges associated with maintaining aggregated information about multiple instances of an activity. In at least one embodiment, the invention includes a method for maintaining aggregations of values contained by fields of multiple database records. The method includes creating multiple aggregation groups. Each group includes a plurality of aggregation records, and each aggregation record includes a value for an aggregation of values contained by fields of a different subset of the multiple database records. The method further includes selecting a first aggregation group upon insertion or update of a first of the multiple database records. The method also includes revising, based on one or more values within the inserted or updated first database record, and as part of a first aggregation group update transaction, the aggregation value of one of the aggregation records of the first aggregation group. Subsequent selection of the first aggregation group is prevented until completion of the first aggregation group update transaction. A second aggregation group is selected while the first aggregation group update transaction is being performed and upon insertion or update of a second of the multiple database records. Based on one or more values within the inserted or updated second database record and during the first aggregation group update transaction, the aggregation value of one of the aggregation records of the second aggregation group is revised. In other aspects of the invention, the aggregation groups are combined into a single table of aggregation records.

In at least another embodiment, the invention includes a method for maintaining aggregated data regarding multiple instances of an organizational activity, each instance of the activity having one of a plurality of process states. The method includes creating a plurality of records in an aggregated data table, each record containing an aggregated value for a subset of the multiple instances in the same process state during the same time period. The method further includes updating the aggregated data table to reflect deletion of data corresponding to instances in one of the process states outside of a preselected time window.

These and other features and advantages of the present invention will be readily apparent and fully understood from the following detailed description of preferred embodiments, taken in connection with the appended drawings.

BRIEF DESCRIPTION OF THE DRAWINGS

FIG. 2 is a portion of an instances data table for the business of FIG. 1.

FIG. 3 is a table aggregating data from various fields of the table of FIG. 2.

FIG. 4 shows update of an aggregated data table to reflect a new instances data record.

FIG. 8 shows implementation of the aggregation table of FIG. 7 according to at least one embodiment of the invention.

FIG. 9 shows a view combining the partitions of a multi-partition aggregation table according to at least one embodiment of the invention.

FIG. 11 shows another table providing aggregated data and in which a business milestone timestamp is used as an aggregation criterion.

DETAILED DESCRIPTION OF THE PREFERRED EMBODIMENTS

The present invention can be advantageously used in combination with the methods, apparatus and systems described in U.S. Patent Application Pub. No. 2003/0225769 (Ser. No. 10/157,968 is now pending), titled "Support for Real-Time Queries Concerning Current State, Data and History of a Process" and filed on May 31, 2002, the contents of which are incorporated by reference herein.

The present invention will be described by reference to Structured Query Language (SQL) instructions and other data analysis features found in the SQL SERVER™ 2000 relational database management system (RDBMS) software and associated Online Analytical Processing (OLAP) services software available from Microsoft Corporation of Redmond, Wash. Although some aspects of SQL instructions that may be used to implement certain embodiments of the invention are described herein, other instructions, programming algorithms and procedures used to implement the invention will be apparent to persons skilled in the art once those persons are provided with the description provided herein. General descriptions of SQL SERVER™ 2000 RDBMS software and associated OLAP services software can be obtained from various sources, including Inside Microsoft® SQL SERVER™ 2000 by Kalen Delaney (2001 Microsoft Press) and Microsoft® SQL SERVER™ 2000 Books Online, available at <http://www.microsoft.com/sql/techinfo/productdoc/2000/>. The invention is not limited to implementation using SQL SERVER™ 2000 RDBMS software and associated OLAP services software, and may be implemented using other types of RDBMS and OLAP software.

The present invention will also be described by reference to RDBMS software (such as the aforementioned SQL SERVER™ 2000 software) operating on a server and accessed by one or more clients. Such configurations are known in the art and described in, e.g., the previously-incorporated U.S. patent application Ser. No. 10/157,968 is now pending. However, a client-server configuration is only one example of a manner in which the invention can be implemented. The invention can also be implemented in other physical system configurations. Embodiments of the invention can also be implemented as a computer-readable storage medium having stored thereon data representing sequences of instructions which, when executed by a processor, cause the processor to perform a method for aggregating data from multiple database records in order to summarize information about multiple instances of an organizational activity.

Figure 1:
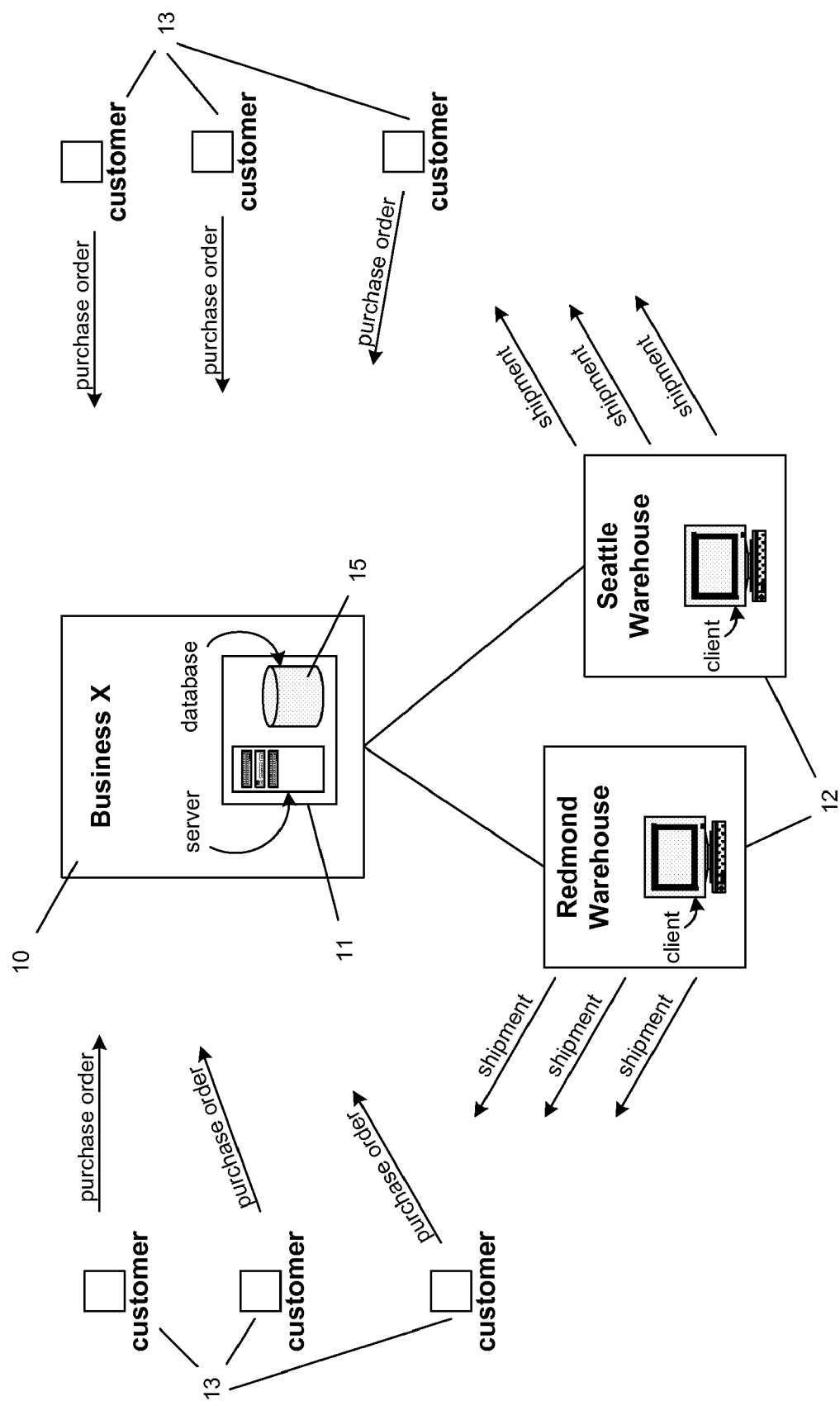
FIG. 1 is a block diagram showing processing of customer orders by a hypothetical wholesale business.

FIG. 1 is a block diagram showing processing of customer orders by a hypothetical wholesale business 10 which sells goods to customers 13 based on customer purchase orders. Business 10 receives purchase orders from multiple customers 13. Upon receipt of each purchase order, business 10 inputs information about the order into a database 15 maintained on a database server 11. Specifically, business 10 creates a new record for the purchase order in the database 11, with fields for various types of information common to individual purchase orders. In the example, each record includes fields for purchase order number, date and time of receipt, city in which the customer 13 is located, and quantity of goods ordered. Business 10 determines whether each purchase order will be accepted or rejected, and then updates one or more other fields in the database 15 to reflect the acceptance or rejection. If a purchase order is accepted, a corresponding sales order is generated and sent to the business 10 warehouse 12 located in the city of the ordering customer 13. When goods are shipped to a customer 13, the time of shipment is input (via a client computer at one of the warehouses 12) into another field of the record. When goods are delivered, yet another field is updated.

Although the above example has been created to describe the invention, the example (including additional aspects described herein) is representative of many actual businesses, albeit in simplified form. Moreover, persons skilled in the art will appreciate that the concepts described with regard to hypothetical business 10 are applicable to a broad spectrum of business and other organizational activities. Indeed, the invention could alternatively be described by a generic reference to an "organization" instead of business 10." Similarly, instead of referring to purchase orders and various stages of order fulfillment, the invention could be described using generic terms such as "instance of an organizational process," a "state" of the organizational process instance, completion of an organizational process instance, etc. Although a simplified example of an actual business type is used in order to provide a more readable description, the invention is not limited to a particular type of organization or organizational activity.

FIG. 2 is a portion of a table 200 from the database 15 of FIG. 1, and is maintained by business 10 and used to store data regarding individual purchase order instances. This instances data table 200 has individual records (e.g., rows) for each purchase order and individual fields (columns) for various types of data. In the example, "PO#" is a purchase order number. "RecvTime" is the date and time the purchase order was received, "City" is the city in which the warehouse 12 closest to the customer 13 issuing a purchase order is located, and "Quantity" is the number of items ordered. "ShipTime" is the time goods for a purchase order were shipped, and "DeliveryTime" is the time those goods were delivered. "ProcessState" is a variable used to describe the portion of the process a purchase order is currently undergoing. If a purchase order has been received but no goods have been shipped, the purchase order is "InProcess." If goods have been shipped but not delivered, the purchase order is "Shipped." If goods have been delivered, the purchase order is "Delivered." Although not shown, there could be other values for ProcessState (e.g., "Denied" of a purchase order was denied). Purchase orders for which goods have not yet been shipped have a <NULL> value in the ShipTime field. Similarly, purchase orders for which goods have not been delivered have a <NULL> value in the DeliveryTime field. As purchase orders are shipped and/or delivered, those fields are updated with the appropriate time values.

As can be seen from FIG. 2, and even with only a limited number of records, a table 200 of raw data can become unwieldy when aggregated information is desired. If, for example, the total goods delivered from a particular warehouse 12 is needed, it is necessary to check each row. A more useful table format for obtaining aggregated data is shown in FIG. 3. In particular, FIG. 3 shows, by warehouse 12, the total number of purchase orders ("Count") that are currently delivered, in process or shipped. FIG. 3 also shows, in the Quantity column, the total number of goods that each warehouse 12 has delivered, shipped, and is processing for shipment.

Figure 5:
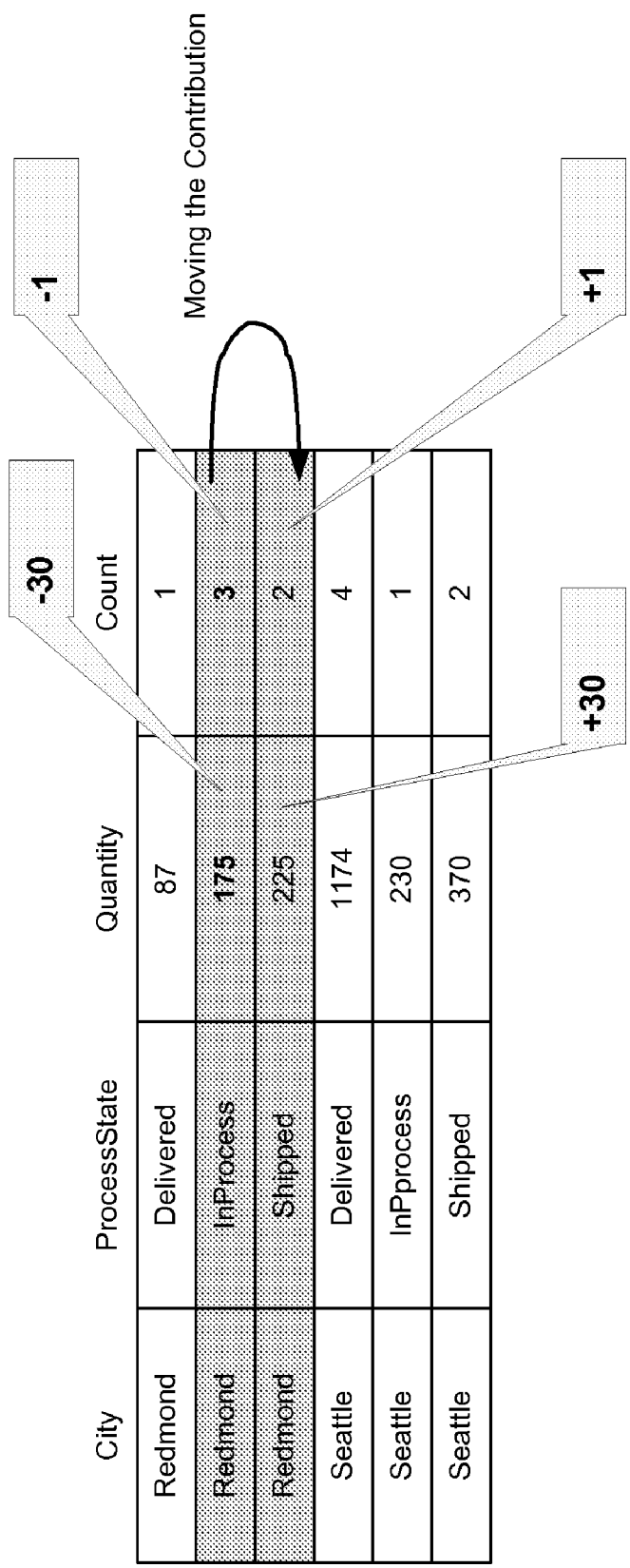
FIG. 5 shows update of an aggregated data table to reflect update of an existing instances data record.

FIG. 4 shows how the table 300 of FIG. 3 would be updated to reflect receipt of a new purchase order number 135 for 30 units from Redmond. Specifically, the "InProcess" total for Redmond is increased by 30 and the Count total is increased by 1. FIG. 5 shows updating the table 300 of FIG. 4 when purchase order number 135 is shipped. The "Quantity" and "Count" totals for Redmond/InProcess purchase orders are respectively decreased by 30 and 1, while the same fields for Redmond/Shipped purchase orders are respectively increased by 30 and 1.

Figure 6:
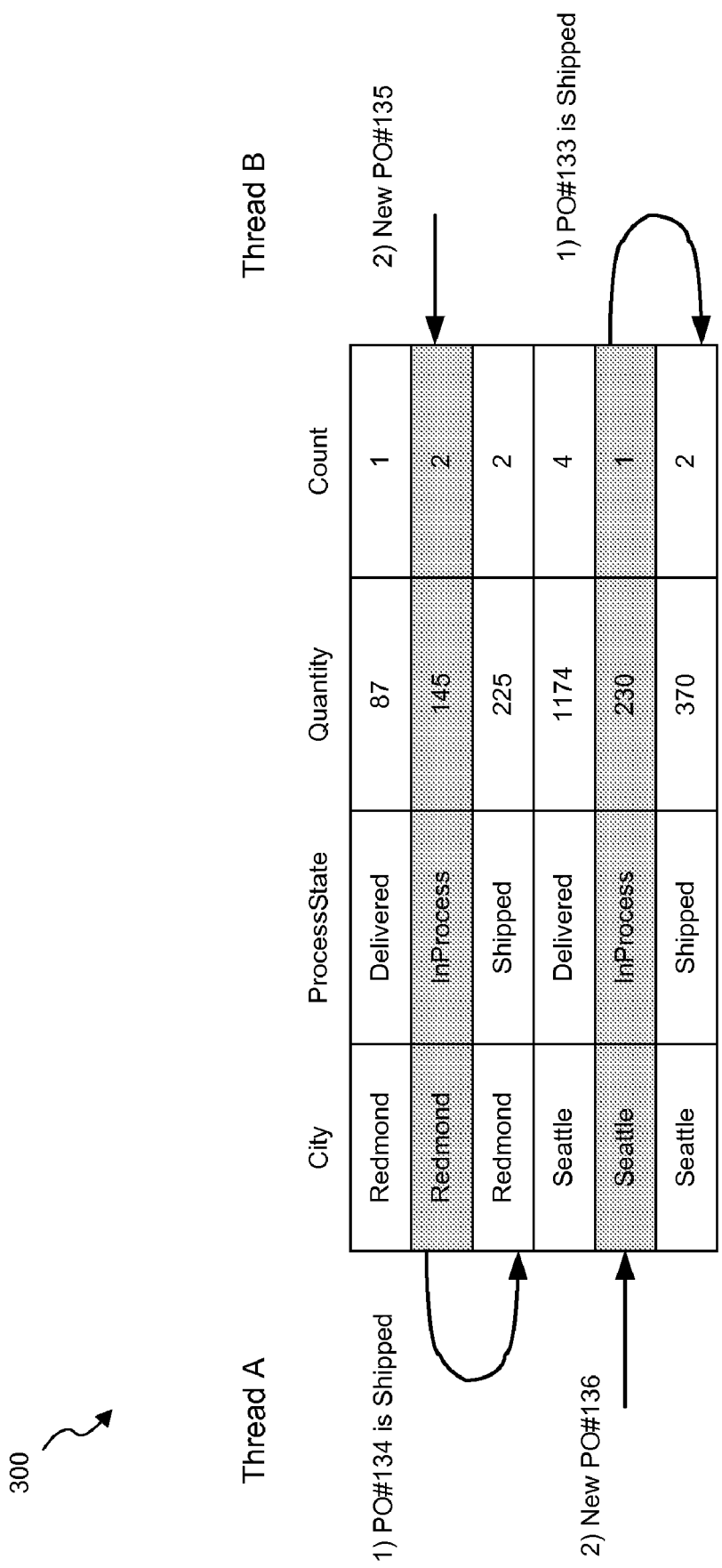
FIG. 6 shows a deadlock between multiple program threads.

Although the updates of FIGS. 4 and 5 are relatively straightforward, problems can occur when multiple programming threads are simultaneously accessing the same aggregated data table. FIG. 6 shows two program threads attempting to simultaneously perform transactions on the same table 300. For simplicity, it is assumed that there is a clustered index on City and on ProcessState (i.e., data rows are stored in order based on the clustered index keys), allowing the records to be accessed from top to bottom in the order shown in FIG. 6. In many database environments, multiple records are modified as part of a single transaction that accesses a table. Because of the processing overhead required for each transaction, batch processing multiple records is often more efficient. It is also a common practice to require that transactions be performed on an "all-or-nothing" basis. In other words, no records are modified unless all parts of the transaction can be completed. Otherwise, integrity of the table 300 could be compromised.

These database processing constraints can cause deadlock. Deadlock occurs in FIG. 6 when program thread A attempts to update three records in one transaction: update Redmond/InProcess and Redmond/Shipped to reflect that purchase order 134 has shipped, and update Seattle/InProcess to reflect new purchase order 136. Simultaneously, program thread B also attempts to update three records in one transaction: update Seattle/InProcess and Seattle/Shipped to reflect that purchase order 133 has shipped, and then update Redmond/InProcess to reflect new purchase order 135. In order to perform its transaction, thread A acquires an exclusive lock on Redmond/InProcess and Redmond/Shipped so as to prevent other threads from affecting those records while they are being updated by thread A. Thread A then attempts to acquire an exclusive lock on Seattle/InProcess. At the same time, thread B acquires an exclusive lock on the records Seattle/InProcess and Seattle/Shipped and makes a modification, and then tries to acquire an exclusive lock on Redmond/InProcess. Because thread A has already locked Redmond/InProcess, thread B cannot complete the first part of its transaction. However, thread B is able to lock Seattle/InProcess and Seattle/Shipped before thread A attempts to lock Seattle/InProcess. Thread A is thus prevented from completing the second part of its transaction. In effect, each thread is waiting for the other to finish, and neither can complete its transaction. Some systems will choose one of the threads as a deadlock victim, roll back any partially completed portions of the victim's transaction, and report an error to the victim. Although this allows the other thread to proceed, and although the victim can retry its transaction, system performance is nonetheless degraded. In particular, processing resources and memory are wasted undoing partially completed transactions, and then further wasted by repeating previously-completed portions of a transaction.

Figure 7:
FIG. 7 shows a multi-partition aggregation table according to at least one embodiment of the invention.

FIG. 7 shows how deadlock is prevented according to at least one embodiment of the invention. A table 700 of aggregated values is partitioned into separate tables 701–702. FIG. 7 shows two partitions numbered 0 and 1 (separated by a bold line) and also indicated by reference numbers 701 and 702, respectively, and the presence of additional partitions is indicated by the vertical ellipsis. Each of the individual partitioned tables 0, 1, etc. contains the same records, but the values in those records will usually differ among the partitions. In the example of FIG. 7, partition 701 has records for Redmond/Delivered, Redmond/InProcess, Redmond/Shipped, Seattle/Delivered, Seattle/InProcess and Seattle/Shipped. Partition 702 also has records for Redmond/Delivered, Redmond/InProcess, Redmond/Shipped, Seattle/Delivered, Seattle/InProcess and Seattle/Shipped. However, the values of Quantity and Count for Redmond/Delivered in partition 701 are different from the values of Quantity and Count for Redmond/Delivered in partition 702, etc. Only a single program thread is permitted to access a particular partition at one time. To illustrate, threads A and B from FIG. 6 are now shown in FIG. 7. In FIG. 7, thread A performs its transaction on partition 701, while thread B simultaneously performs its transaction on partition 702. Because the threads are no longer competing for access to the same records, deadlock is avoided.

In one embodiment of the invention implemented using SQL SERVER™ 2000 RDBMS software, the partitioned tables 701–702 of FIG. 7 are implemented as a separate SQL table 800, such as is shown in FIG. 8. The partition number is included as an additional field ("PartitionID"). This multi-partition aggregation table 800 is maintained by a trigger on the instances data table 200 of FIG. 2. As known in the art, a "trigger" is a special type of SQL stored procedure which is automatically invoked by an INSERT, UPDATE or DELETE statement. Whenever a new record is inserted into the instances data table 200 of FIG. 2, the trigger causes a corresponding contribution to be made to one of the partitions of the multi-partition aggregation table 800 of FIG. 8. Similarly, when a record in the instances data table 200 (FIG. 2) is updated, the corresponding records of multi-partition aggregation table 800 (FIG. 8) are also updated.

At any given time, an individual one of partitions 801–804 in the table 800 of FIG. 8 will not have complete information about business 10. One update to the instances data table 200 (FIG. 2) may cause an update within partition 801 (PartitionID=0), while another update to the instances data table may cause an update within partition 802 (PartitionID=1), etc. Moreover, creation of a record in the instances data table 200 may cause update of a record in the table of one of partitions 801–804 of FIG. 8, and a later update of that same instances data record might cause update of records in a different one of partitions 801–804. For example, adding new purchase order number 140 (Redmond, Quantity=200) to FIG. 2 might cause the Quantity and Count fields of the <PartitionID=1>/<City=Redmond>/<ProcessState=InProcess> record in FIG. 8 to be increased by 200 and 1. However, when goods for purchase order 140 are shipped, the Quantity and Count fields of the <PartitionID=3>/<City=Redmond>/<ProcessState=InProcess> record in FIG. 8 might be reduced by 200 and 1 and the same fields of the <PartitionID=3/<City=Redmond>/<ProcessState=Shipped> record increased by 200 and 1. Accordingly, the partitions 801–804 are combined to provide a complete data aggregation table for business 10. In particular, the following SQL code is used in at least one embodiment:

```
CREATE VIEW <view_name>
AS
SELECT City, ProcessState, SUM(Quantity), SUM(Count)
FROM <multi_partition_table>
GROUP BY City, ProcessState
```

The first italicized name ("view_name") is a name for a view in which the individual partitions are combined. The second italicized name ("multi_partition_table") is the name of the multi-partition aggregation table 800 of FIG. 8. The resulting table 900 ("view_name") would be in the form shown in FIG. 9. Because each of partitions 801–804 of the multi-partition aggregation table 800 contains relatively few records, the partitions 801–804 can be combined relatively quickly. In effect, the summaries are summarized. In other embodiments, each of partitions 801–804 can be implemented as a separate table and then joined in a CREATE VIEW command with the SQL JOIN statement.

So that each of partitions 801–804 is only accessed by one program thread at a time, a thread must have possession of a virtual token in order to access one of partitions 801–804. In one embodiment of the invention, the token is obtained by a call to a special stored procedure named Get_Mutex. As previously discussed, the multi-partition aggregation table 800 is maintained by a SQL trigger. Before a row within the multi-partition aggregation table 800 can be updated, one or more instructions within the trigger must indicate which row is to be updated. As part of those instructions, the Get_Mutex stored procedure is called. The Get_Mutex procedure then returns a value for the PartitionID column of the table 800. While a thread is performing a transaction on records having that returned PartitionID value, other threads are prevented from obtaining the same value, and thereby prevented from accessing one of partitions 801–804 while it is being updated by another thread.

Referring to a prior example, when a record for purchase order 140 is initially created in the instances data table 200 (FIG. 2), the trigger is fired. That trigger then:

calls Get_Mutex and receives a value for PartitionID;
determines the row(s) within the partition to be updated;
identifies the row of the multi-partition aggregation table 800 where PartitionID equals the PartitionID value returned by the Get_Mutex procedure, where City equals the value of City in the instances data record for purchase order 140, and where ProcessState equals "InProcess";
increases the value for Quantity in that row by the value of Quantity in the instances data record for purchase order 140; and
increases the value for Count in that row by 1.

As a further illustration, an existing instances data table record for purchase order 140 is later updated to change ProcessState from InProcess to Shipped. Additional logic in the trigger would then:

call Get_Mutex and receive a value for PartitionID;
determine the row(s) within the partition to be updated;
identify the row of the multi-partition aggregation table 800 where PartitionID equals the value returned by the Get_Mutex procedure, where City equals the value of City in the instances data record for purchase order 140, and where ProcessState equals InProcess;
decrease the value for Quantity in that row by the value for Quantity in the instances data record for purchase order 140;
decrease the value of Count in that row by 1;
identify the row of the multi-partition aggregation table 800 where PartitionID equals a value returned by the Get_Mutex procedure, where City equals the value of City in the instances data record for purchase order 140, and where ProcessState equals Shipped;
increase the value for Quantity in that row by the value for Quantity in the instances data record for purchase order 140; and
increase the value of Count in that row by 1.

Similar logic would identify and modify the appropriate rows in the multi-partition aggregation table 800 when purchase order 140 ProcessState changes from Shipped to Delivered.

Figure 10:
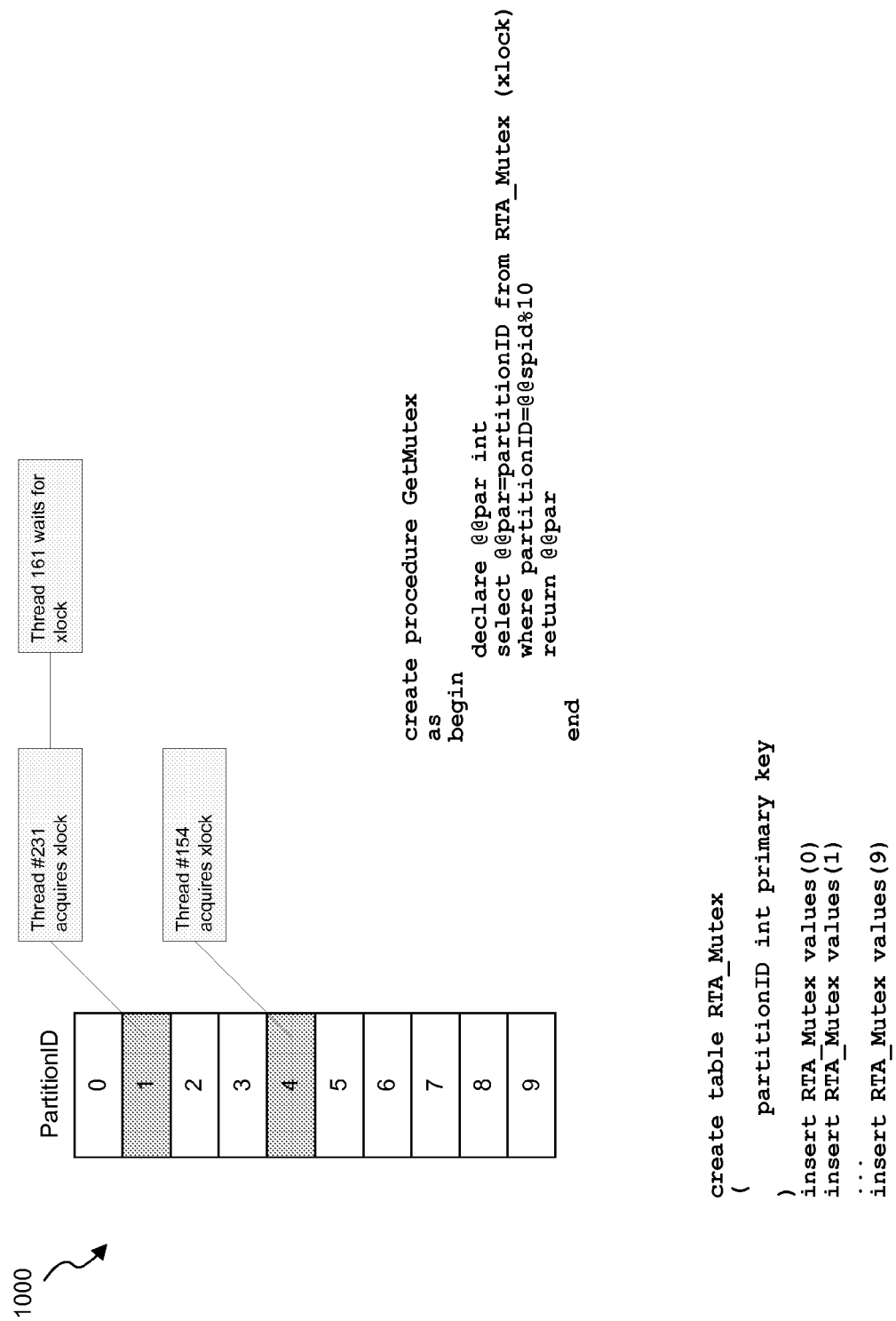
FIG. 10 shows one implementation of a stored procedure to assign partitions to program threads.

One implementation for Get_Mutex is shown in FIG. 10. First, a single-column table named RTA_Mutex 1000 is created ("create table RTA_Mutex"). The RTA_Mutex table 1000 has the same number of rows as there are partitions in the multi-partition aggregation table 800 of FIG. 8; each field is then assigned one of the PartitionID values. In the example of FIG. 10, it is assumed that the table 800 of FIG. 8 includes 10 partitions (i.e., PartitionID has integer values from 0 through 9). Next, the Get_Mutex stored procedure is created. After declaring the local variable @par, the local spar variable is assigned a value from one of the rows of the RTA_Mutex table 1000. Specifically, the "select" statement assigns to @par the value of PartitionID from the RTA_Mutex table 1000 where PartitionID equals "@@spid%10". The system function @@spid returns the server process identifier of the current user process. In other words, the @@spid function returns a number identifying the program thread that called the Get_Mutex stored procedure. The modulo arithmatic operator ("%") then returns the remainder of that program thread identifier divided by 10. The procedure then finds a row of RTA_Mutex where the value for PartitionID equals that remainder, and locks that row with an exclusive lock locking hint ("(xlock)"). The value of PartitionID in that locked RTA_Mutex row is then returned as the result of the Get_Mutex stored procedure. Because of the exclusive lock on that row, no other programming threads are allowed to access that row of the RTA_Mutex table 1000, and are therefore unable to obtain that PartitionID value until completion of the transaction that previously acquired that PartitionID value.

By way of illustration, a program thread having an identifier of 231 calls Get_Mutex. The remainder of 231 divided by 10 is 1; the value returned to the programming thread by Get_Mutex is thus the value of the field in RTA_Mutex 1000 where PartitionID equals 1. Upon return of a value from Get_Mutex, program thread 231 is then able to update row(s) of partition 802 in FIG. 8. While thread 231 is updating partition 802, program thread 161 calls Get_Mutex. However, because the transaction of thread 231 is not completed, thread 161 is not able to access the row of RTA_Mutex 1000 holding a value of 1 for PartitionID. Thread 161 is then queued until the exclusive lock on the necessary RTA_Mutex row is released (i.e., the transaction of thread 231 completes). If additional threads attempt to access that RTA_Mutex row, they are also queued on a first-in-first-out (or other) basis. Notably, thread 161 does not proceed until a value is returned from its call to Get_Mutex, and thread 161 therefore does not attempt to access partition 802 while thread 231 is accessing partition 802. While thread 161 is waiting in the queue for the xlock to release, thread 154 calls Get_Mutex. Because there is currently no lock on the row of RTA_Mutex 1000 where PartitionID =4, Get_Mutex returns a value (4) to thread 154.

FIG. 10 is only one example of a manner in which a Get_Mutex procedure could be implemented. As another example, all threads attempting to access a partition 801–810 could enter a first-in-first-out queue. Each thread in the queue could then be assigned the first available partition.

In one embodiment, the number of partitions is at least equal to, and preferably greater than, the number of processors on the database server 11.

As previously indicated, the size of the instances data table 200 (FIG. 2) will grow over time as more and more purchase orders are received. However, the size of the aggregation table 900 of FIG. 9 (or of the multi-partition aggregation table 800 of FIG. 8) will not increase unless additional aggregation fields are added (e.g., Redmond/Denied and Seattle/Denied). Although the size of the tables 800, 900 will not grow, however, the values of the Quantity and Count columns will increase. Often, an organization only requires aggregated data for events within a certain time "window." For example, business 10 may require aggregated data for purchase orders currently in process, for orders that are currently being shipped, and for orders that were delivered within the last 24 hours. Moreover, business 10 may want to further sort the data based on, e.g., the time of day in which events occur. Referring to FIG. 11, business 10 managers wish to know how many purchase orders became in process in Redmond and in Seattle during the most recent 8:00 a.m. hour and have not been shipped (0 in the example), during the most recent 9:00 a.m. hour (also 0 in the example), during the most recent 10:00 a.m. hour (2 and 1), etc. Similarly, the managers also want to know how many purchase orders were shipped at 8:00 a.m. but not yet delivered, were shipped at 9:00 a.m. but not yet delivered, etc. The managers also want to know how many purchase orders were delivered from those locations during those time periods. However, this means that the aggregation table 1100 grows each hour. Unlike purchase orders that are "InProcess" or "Shipped," and which will ultimately become "Delivered," a "Delivered" purchase order does not transition to another state. Put differently, once a purchase order becomes "Delivered" at a particular hour on a particular day, a record will persist in the aggregation table 1100 for that hour/day unless some action is taken. Over time, the table would thus become large and slow to query. On the other hand, the managers are less interested in knowing the total number of purchase orders that have been delivered from a location over a longer period (e.g., in the last week, etc.). Although such information may be useful for some purposes, it is needed relatively infrequently.

Figure 12:
FIG. 12 illustrates a table facilitating, according to one embodiment of the invention, deletion of stale aggregated data.

FIG. 12 shows how, in at least one embodiment of the invention, data for inactive purchase order instances (e.g., delivered purchase orders) may be purged from the real-time aggregation table 1200 when that data reaches a certain age. For simplicity, only a single partition is shown. However, and as persons skilled in the art will appreciate based on the following description, the embodiment of FIG. 12 can be implemented in conjunction with the previously-described multi-partition embodiment.

As seen in FIG. 12, columns for TimeSlice and Hour have been added to the real-time aggregation table 900 of FIG. 9. TimeSlice is the server date and time (with hour precision) that the instances data table 200 (FIG. 2) is updated to reflect that an instance is completed. In the example, a purchase order becomes completed when ordered goods have been delivered to the customer 13. Hour is the hour of the day in which the event of interest occurs. In the example, the time component of TimeSlice is the same as Hour for a completed record, although this need not be the case.

As in the previous example, the data of the real-time aggregation table 1200 of FIG. 12 is modified by a trigger which fires when data records of the instances data table 200 are inserted or updated. The value of the TimeSlice column is automatically generated by the trigger according to two rules. If more updates are expected to a record (e.g., the goods have not yet been delivered), TimeSlice is NULL. Otherwise, a number is generated that represents the current time (with hour precision) and date. Notably, a non-NULL TimeSlice value for a completed purchase order does not prevent aggregation of data for completed purchase orders. Because the time component of TimeSlice only has hour precision, purchase orders delivered from the same warehouse 12 during the same 1 hour period can be aggregated in a single record. For example, purchase orders 126 and 128 (FIG. 2) were delivered at 3:10 p.m. and 3:05 p.m., respectively. As seen in FIG. 12, the record for Jan 20 3 p.m./3/Seattle/Delivered shows a Count of 2 and a Quantity of 790, which correlates with data records for purchase order 126 and purchase order 128 in FIG. 2.

Each time the trigger modifies the real-time aggregation table 1200 of FIG. 12, the trigger also determines whether any of the completed instance aggregated data in the table 1200 is stale, i.e., no longer needed. In the example, it is assumed that aggregated data for instances completed more than 24 hours ago is stale and should be removed from the aggregated data table 1200. Accordingly, each time the trigger modifies the table 1200 of FIG. 12, the trigger deletes records having a TimeSlice value in which the latest time in that time slice period is more than 24 hours prior to the current time. If the trigger updates the table 1200 of FIG. 12 at 1:05 p.m. on January 21, the record for Jan 20 12p.m./12/Seattle/Delivered will be deleted, as all data in that record corresponds to purchase orders completed more than 24 hours ago. In at least one embodiment, the table 1200 of FIG. 12 is displayed in a view which hides the TimeSlice data from the user.

Figure 13:
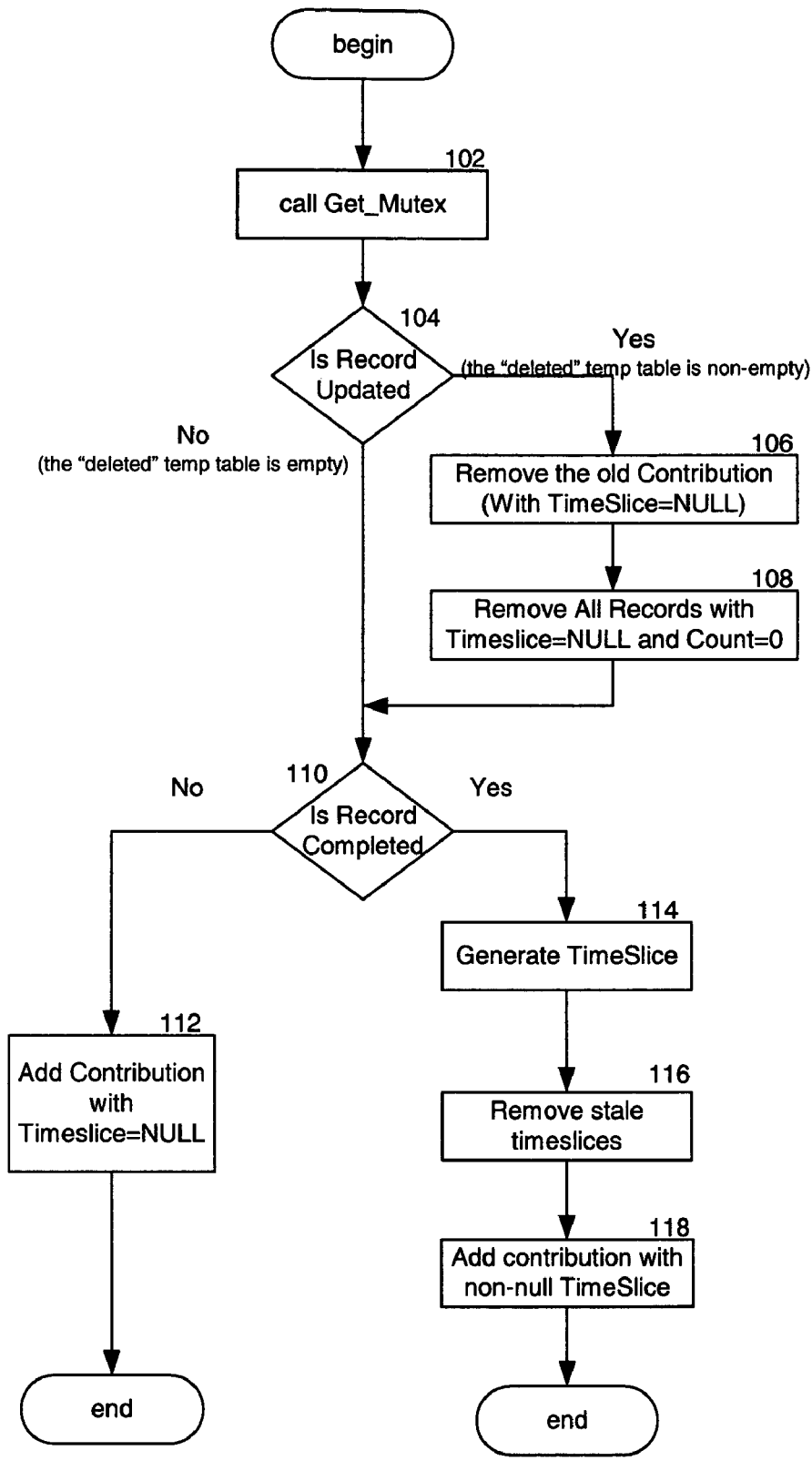
FIG. 13 is a flow chart showing logic for a trigger to maintain a real-time data aggregation table according to at least one embodiment of the invention.

FIG. 13 is a flow chart showing logic for a trigger that maintains a real-time data aggregation table (such as in FIG. 12) in multiple partitions. In particular, the flow chart of FIG. 13 shows logic that is followed by the trigger in each individual programming thread during a transaction to update one or more aggregated data records in a partition. Each thread updates an individual partition, with each partition having a format similar to the table of FIG. 12. During execution, the trigger accesses two system tables named "inserted" and "deleted" that are maintained in memory (e.g., RAM) by a SQL database server 11. The inserted and deleted tables are automatically generated by the database server 10, and temporarily store copies of data from a row affected during a preceding attempt to insert a record into or to update an existing record of an instances data table (such as 200 in FIG. 2). Specifically, the inserted table contains values inserted into a row of the instances data table 200, and the deleted table contains values replaced in an updated row of the instances data table 200.

After beginning, the trigger first obtains the token at block 102. The trigger obtains the token by a call to a procedure such as Get_Mutex, as previously described. At block 104, the trigger then determines whether an instances data record is being updated. In particular, the trigger determines if the deleted table is empty. If the deleted table is not empty, a Quantity value in the deleted table is used at block 106 to decrease the Quantity value for the appropriate record of the partition. In particular, the trigger identifies the record in the partition where Hour equals the hour during which the instances data record was updated to its previous ProcessState value, where City equals the city of the updated instances data record, and where ProcessState equals the previous process state of the updated record. The Count value for that record is also decreased by 1. At block 108, the trigger then determines whether any records in the partition have a NULL value for TimeSlice and a Count value of 0. If so, those records are deleted.

At block 110, the trigger determines whether the instances data record being updated (or inserted) is complete. In other words, the trigger determines whether further updates are expected. This can be performed in various ways. For example, an "IsComplete" column could be added to each instance record and set to "1" when the update is final. In other embodiments, various process state values (e.g., "Delivered" or "Denied") could signal process completion for the instance. If the instances data record is not complete (i.e., the process is still active as to the purchase order instance being updated and further updates are expected), the Quantity value from the "inserted" table is used at block 112 to increase the Quantity value of the record in the aggregation table partition where TimeSlice equals NULL, Hour equals the hour the instances data record was updated to its current ProcessState value, City equals the city of the updated instances data record, and ProcessState equals the current ProcessState value of the updated instances data record. The Count value in that partition record is also increased by 1. The trigger then concludes.

If at block 110 the trigger determines that the instances data record being updated is complete, a TimeSlice value is generated at block 114. At block 116, the trigger deletes all records having a TimeSlice value outside of the selected time window (e.g., older than 24 hours). The trigger then identifies (or creates, if necessary) a partition record in which the value of TimeSlice equals the just-generated TimeSlice value, where Hour equals the hour of completion, where City equals the city of the updated instances data record, and where ProcessState equals the value from the completed instances data record ("Delivered" in the example). The Quantity value from the "inserted" table is then used to increase the Quantity value of the identified (or created) partition record. The Count value for that partition record is also increased by 1. The trigger then concludes.

In other embodiments, the trigger logic of FIG. 13 could be modified to accommodate updates of multiple records in the instances data table 200. Instead of ending after blocks 112 or 118, the trigger would determine whether there are additional instance records being updated as part of a batch update of the instances data table 200. If so, the trigger logic would loop back to block 104. If not, the trigger would then conclude. In still other embodiments, the time window could be adjusted by a user.

Figure 14:
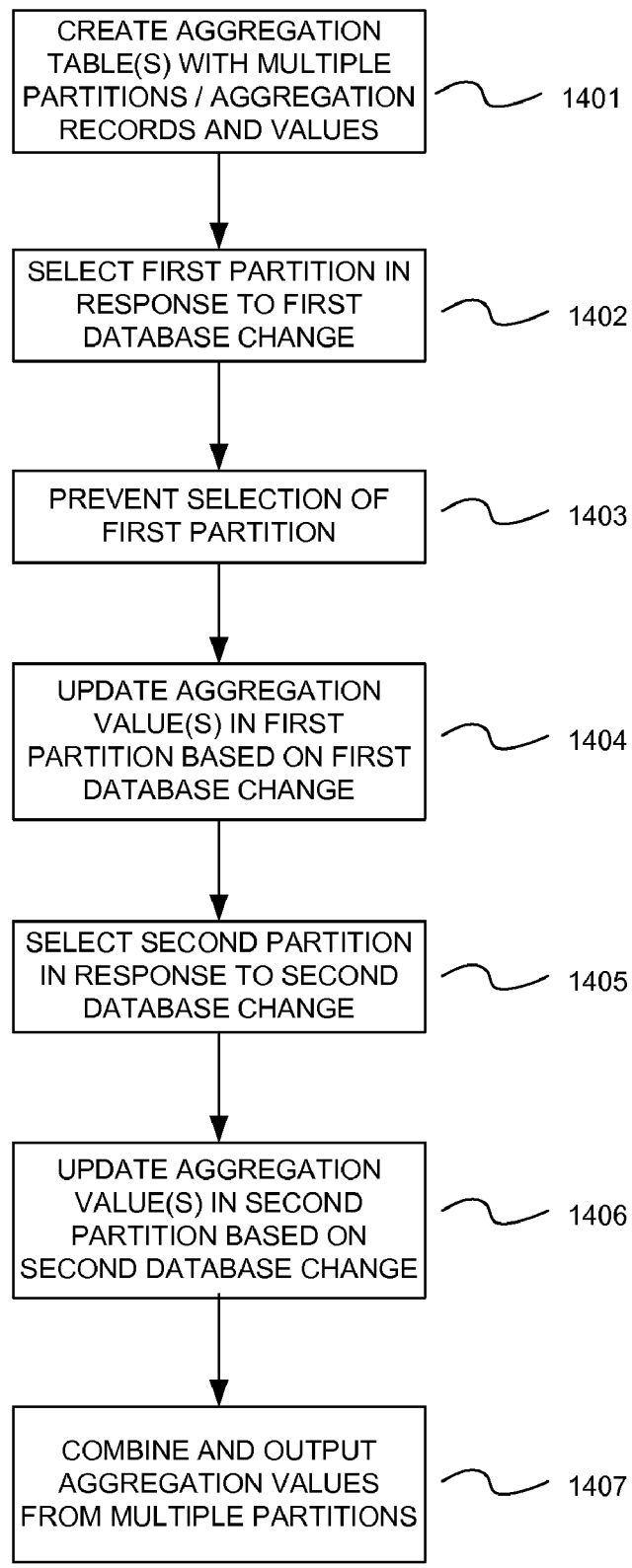
FIG. 14 is a flow chart showing logic for maintaining and providing aggregation values based on multiple database records according to at least one embodiment of the invention.

Referring now to FIG. 14, a flow chart is shown illustrating logic for aggregating data from multiple database records in order to summarize information about multiple instances of an organizational activity, in accordance with at least some embodiments. In step 1401, one or more aggregation tables is created representing multiple partitions, each partition including aggregation records (and aggregation values included in the aggregation records) corresponding to multiple database records. In step 1402, a change to at least one of the multiple database records (e.g., an insertion or update into the instances data table 200) has been detected. In response to this change, a first partition containing an aggregation record/value corresponding to the changed database record(s) is selected (e.g., accessed by a first program thread). In step 1403, access to this partition by other program threads is prevented (e.g., by the first program thread acquiring an exclusive lock on the first partition) until the thread has completed its update of the aggregation value(s). In step 1404, one or more aggregation values corresponding to the changed database records are revised in the selected first partition. In step 1405, another change to at least one of the database records (e.g., an insertion or update of the same or different database records of the instances data table 200) has been detected. In response to this second change, a second partition containing an aggregation record/value corresponding to the changed database record(s) is selected (e.g., accessed by a second program thread). In step 1406, an aggregation value in the second partition is updated by the second program thread based on the values inserted or updated in the changed database record. Finally, in step 1407, the aggregation values from multiple partitions are combined and output.

Although the invention has been described using a hypothetical business type as an example, it should be remembered that the invention is not limited to a particular type of business, organization or activity. Moreover, the invention is not limited to implementations in which values are aggregated by summing values of fields in database records. As but one example, an aggregation table could be created in which the aggregated values represent averages of values of fields in database records. Accordingly, although specific examples of carrying out the invention have been described, those skilled in the art will appreciate that there are numerous variations and permutations of the above described systems and techniques that fall within the spirit and scope of the invention as set forth in the appended claims. These and other modifications are within the scope of the invention as defined by the appended claims.

The invention claimed is:

1. A method for aggregating data from multiple records of a database in order to summarize information about multiple instances of an organizational activity, wherein each of the multiple database records corresponds to one of the multiple organizational activity instances, wherein data within each of the multiple database records reflects an attribute of the organizational activity instance corresponding to that record, and wherein the method is performed by a plurality of program threads in at least one computer, comprising:

creating at least one aggregation table representing multiple partitions, each partition including a plurality of aggregation records, each aggregation record including an aggregation value representing an aggregation of values contained by fields of a distinct subset of the multiple database records;

selecting a first of the multiple partitions upon insertion or update of a first of the multiple database records, wherein said selecting is initiated in response to a request by a first of the plurality of program threads to access one of the multiple partitions;

updating the aggregation value in at least one of the aggregation records in the first partition, wherein the updating is performed by the first program thread as part of a first partition update transaction, and wherein the first partition update transaction is based on one or more values within the inserted or updated first database record;

preventing other program threads from accessing the first partition until the first program thread no longer requires access to the first partition;

selecting a second partition, while the first partition update transaction is being performed, wherein said selecting is initiated in response to a request by a second of the plurality of program threads to access one of the multiple partitions;

updating the aggregation value in at least one of the aggregation records in the second partition, wherein the updating is performed by the second program thread as part of a second partition update transaction, wherein the second partition update transaction is based on one or more values within an inserted or updated second database record, and wherein the second partition update transaction is performed during performance of the first partition update transaction; and aggregating aggregation values from the multiple partitions and outputting said aggregated aggregation values as a part of a summary of the multiple organizational activity instances, and wherein each of the multiple database records includes a field having a value indicating the corresponding instance to be in one of several process states, and each partition includes time-sorted aggregation records, each time-sorted aggregation record containing an aggregation value for instances in one of the several process states during a time period associated with the time-sorted aggregation record.

2. The method of claim 1, wherein each of the multiple partitions is represented in a separate aggregation table.

3. The method of claim 1, further comprising:

selecting a third partition upon initiation of a subsequent transaction to update the first of the multiple database records; and revising, based on one or more values within the subsequently updated first database record, the aggregation value of an aggregation record of the third partition.

4. The method of claim 1, wherein the step of aggregating aggregation values comprises combining the multiple partitions into a single table of aggregation records, each record of the single table aggregating values of an aggregation record from each of the multiple partitions.

5. The method of claim 1, wherein said creating at least one aggregation table comprises creating at least three partitions.

6. The method of claim 1, wherein said creating at least one aggregation table comprises creating at least ten partitions.

7. The method of claim 1, wherein the steps of the method are performed on a computer with at least one processor, and wherein said creating at least one aggregation table comprises creating a number of partitions greater than the number of processors in said computer.

8. The method of claim 1, further comprising:

determining, upon receiving a request from the first program thread for access to a partition, a system identifier for the first program thread; and assigning a partition identifier to the first program thread based on the determined system identifier.

9. The method of claim 1, wherein one of said several process states comprises an instance being completed, and further comprising:

revising the aggregation values of the time-sorted aggregation records so as to exclude from said revised values the effects of records corresponding to instances completed outside of a preselected time window.

10. The method of claim 1, further comprising:

deleting an aggregation record from a partition subsequent to a determination that none of the multiple database records associated with said partition were in one of the process states during a time period corresponding to the deleted aggregation record.

11. The method of claim 1, wherein the one of the process states corresponds to an instance being completed and wherein each of the multiple database records includes a completion time field; and further comprising:

assigning a null value to the completion time field for database records corresponding to instances that are not completed;

assigning a non-null value to the completion time field for database records corresponding to instances in the completed process state.

12. The method of claim 11, further comprising:

determining if a record of the multiple database records has been updated;

revising, upon determining that the database record has been updated and based on said update, an aggregation value of one of the plurality of aggregation records;

further determining whether the updated database record contains a value indicating the corresponding instance is in the completed process state;

generating, upon determining that the corresponding instance is in the completed process state, a time of completion value for the instance; and updating the one of the plurality of aggregation records based on the time of completion value for the instance.

13. The method of claim 1, wherein preventing other program threads from accessing the first partition comprises providing the first program thread with a virtual token corresponding to the first partition, and wherein possession of said virtual token is required to access said first partition.

14. A computer-readable storage medium having stored thereon data representing sequences of instructions which, when executed by a processor, cause the processor to perform a method for aggregating data from multiple records of a database in order to summarize information about multiple instances of an organizational activity, wherein each of the multiple database records corresponds to one of the multiple organizational activity instances, wherein data within each of the multiple database records reflects an attribute of the organizational activity instance corresponding to that record, and wherein the method is performed by a plurality of program threads in at least one computer, the instructions comprising:

instructions for creating at least one aggregation table representing multiple partitions, each partition including a plurality of aggregation records, each aggregation record including a value for an aggregation of values contained by fields of a distinct subset of multiple database records;

instructions for selecting a first of the multiple partitions upon insertion or update of a first of the multiple database records, wherein said selecting is initiated in response to a request by a first of the plurality of program threads to access one of the multiple partitions;

instructions for updating the aggregation value in at least one of the aggregation records in the first partition, wherein the updating is performed by the first program thread as part of a first partition update transaction, and wherein the first partition update transaction is based on one or more values within the inserted or updated first database record;

instructions for preventing other program threads from accessing the first partition until the first program thread no longer requires access to the first partition;

instructions for selecting a second partition, while the first partition update transaction is being performed, wherein said selecting is initiated in response to a request by a second of the plurality of program threads to access one of the multiple partitions;

instructions for updating the aggregation value in at least one of the aggregation records in the second partition, wherein the updating is performed by the second program thread as part of a second partition update transaction, wherein the second partition update transaction is based on one or more values within an inserted or updated second database record, and wherein the second partition update transaction is performed during performance of the first partition update transaction; and instructions for aggregating aggregation values from the multiple partitions and outputting said aggregated aggregation values as a part of a summary of the multiple organizational activity instances, and wherein each of the multiple database records includes a field having a value indicating the corresponding instance to be in one of several process states, and each partition includes time-sorted aggregation records, each time-sorted aggregation record containing an aggregation value for instances in one of the several process states during a time period associated with the time-sorted aggregation record.

15. The computer-readable storage medium of claim 14, wherein each of the multiple partitions is represented in a separate aggregation table.

16. The computer-readable storage medium of claim 14, further comprising:

instructions for selecting a third partition upon initiation of a subsequent transaction to update the first of the multiple database records; and instructions for revising, based on one or more values within the subsequently updated first database record, the aggregation value of an aggregation record of the third partition.

17. The computer-readable storage medium of claim 14, wherein aggregating aggregation values comprises combining the multiple partitions into a single table of aggregation records, each record of the single table aggregating values of an aggregation record from each of the multiple partitions.

18. The computer-readable storage medium of claim 14, wherein said creating at least one aggregation table comprises creating at least three partitions.

19. The computer-readable storage medium of claim 14, wherein said creating at least one aggregation table comprises creating at least ten partitions.

20. The computer-readable storage medium of claim 14, further comprising:

instructions for determining, upon receiving a request from the first program thread for access to a partition, a system identifier for the first program thread; and instructions for assigning a partition identifier to the first program thread based on the determined system identifier.

21. The computer-readable storage medium of claim 14, wherein one of said several process states comprises an instance being completed, and further comprising:

instructions for revising aggregation values of the time-sorted aggregation records so as to exclude from said revised values the effects of records corresponding to instances completed outside of a preselected time window.

22. The computer-readable storage medium of claim 14, further comprising:

instructions for deleting an aggregation record from a partition subsequent to a determination that none of the multiple database records associated with said partition were in one of the process states during a time period corresponding to the deleted aggregation record.

23. The computer-readable storage medium of claim 14, wherein the one of the process states corresponds to an instance being completed and wherein each of the multiple database records includes a completion time field; and further comprising:

instructions for assigning a null value to the completion time field for database records corresponding to instances that are not completed;

instructions for assigning a non-null value to the completion time field for database records corresponding to instances in the completed process state.

24. The computer-readable storage medium of claim 23, further comprising:
 instructions for determining if a record of the multiple database records has been updated;
 instructions for revising, upon determining that the database record has been updated and based on said update, an aggregation value of one of the plurality of aggregation records;
 instructions for further determining whether the updated database record contains a value indicating the corresponding instance is in the completed process state;
 instructions for generating, upon determining that the corresponding instance is in the completed process state, a time of completion value for the instance; and
 instructions for updating the one of the plurality of aggregation records based on the time of completion value for the instance.

25. The computer-readable storage medium of claim 14, wherein preventing other program threads from accessing the first partition comprises providing the first program thread with a virtual token corresponding to the first partition, and wherein possession of said virtual token is required to access said first partition.

26. A data processing apparatus for aggregating data from multiple records of a database in order to summarize information about multiple instances of an organizational activity, wherein each of the multiple database records corresponds to one of the multiple organizational activity instances, and wherein data within each of the multiple database records reflects an attribute of the organizational activity instance corresponding to that record, comprising:
 at least one data storage device;
 at least one user input device; and
 a processor operatively connected to said storage device and said user input device, wherein the at least one data storage device has stored thereon a set of instructions which, when executed, configure said processor to
 create at least one aggregation table representing multiple partitions, each partition including a plurality of aggregation records, each aggregation record including an aggregation value representing an aggregation of values contained by fields of a distinct subset of the multiple database records,
 select a first of the multiple partitions upon insertion or update of a first of the multiple database records, wherein said selecting is initiated in response to a request by a first program thread to access one of the multiple partitions,
 update the aggregation value in at least one of the aggregation records in the first partition, wherein the updating is performed by the first program thread as part of a first partition update transaction, and wherein the first partition update transaction is based on one or more values within the inserted or updated first database record,
 prevent other program threads from accessing the first partition until the first program thread no longer requires access to the first partition,
 select a second partition, while the first partition update transaction is being performed, wherein said selecting is initiated in response to a request by a second program thread to access one of the multiple partitions,
 update the aggregation value in at least one of the aggregation records in the second partition, wherein the updating is performed by the second program thread as part of a second partition update transaction, wherein the second partition update transaction is based on one or more values within an inserted or updated second database record, and wherein the second partition update transaction is performed during performance of the first partition update transaction, and
 aggregate aggregation values from the multiple partitions and output said aggregated aggregation values as a part of a summary of the multiple organizational activity instances, and wherein
  each of the multiple database records includes a field having a value indicating the corresponding instance to be in one of several process states, and
  each partition includes time-sorted aggregation records, each time-sorted aggregation record containing an aggregation value for instances in one of the several process states during a time period associated with the time-sorted aggregation record.

27. The data processing apparatus of claim 26, wherein the set of instructions includes additional instructions which, when executed, configure said processor to:
 select a third partition upon initiation of a subsequent transaction to update the first of the multiple database records and
 revise, based on one or more values within the subsequently updated first database record, the aggregation value of an aggregation record of the third partition.

28. The data processing apparatus of claim 26, wherein aggregating aggregation values comprises combining the multiple partitions into a single table of aggregation records, each record of the single table aggregating values of an aggregation record from each of the multiple partitions.

29. The data processing apparatus of claim 26, wherein the set of instructions includes additional instructions which, when executed, configure said processor to:
 determine, upon receiving a request from the first program thread for access to a partition, a system identifier for the first program thread, and
 assign a partition identifier to the first program thread based on the determined system identifier.

30. The data processing apparatus of claim 26, wherein the set of instructions includes additional instructions which, when executed, configure said processor to:
 revise the aggregation values of the time-sorted aggregation records so as to exclude from said revised values the effects of records corresponding to instances completed outside of a preselected time window.

31. The data processing apparatus of claim 26, wherein the one of the process states corresponds to an instance being completed, wherein each of the multiple database records includes a completion time field, and wherein the set of instructions includes additional instructions which, when executed, configure said processor to:
 assign a null value to the completion time field for database records corresponding to instances that are not completed, and
 assign a non-null value to the completion time field for database records corresponding to instances in the completed process state.

32. The data processing apparatus of claim 31, wherein the set of instructions includes additional instructions which, when executed, configure said processor to:
 determine if a record of the multiple database records has been updated,
 revise, upon determining that the database record has been updated and based on said update, an aggregation value of one of the plurality of aggregation records, further determine whether the updated database record contains a value indicating the corresponding instance is in the completed process state generate, upon determining that the corresponding instance is in the completed process state, a time of completion value for the instance, and update the one of the plurality of aggregation records based on the time of completion value for the instance.

33. The data processing apparatus of claim 26, wherein preventing other program threads from accessing the first partition comprises providing the first program thread with a virtual token corresponding to the first partition, and wherein possession of said virtual token is required to access said first partition.

* * * * *